No. 826,585. PATENTED JULY 24, 1906.
I. LEHMAN.
CASING FOR UNIVERSAL JOINTS.
APPLICATION FILED APR. 3, 1906.
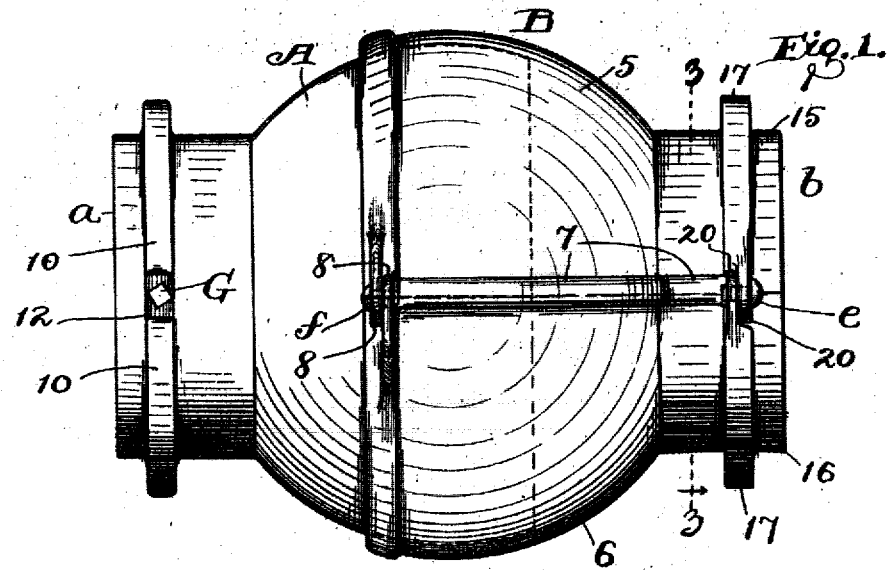
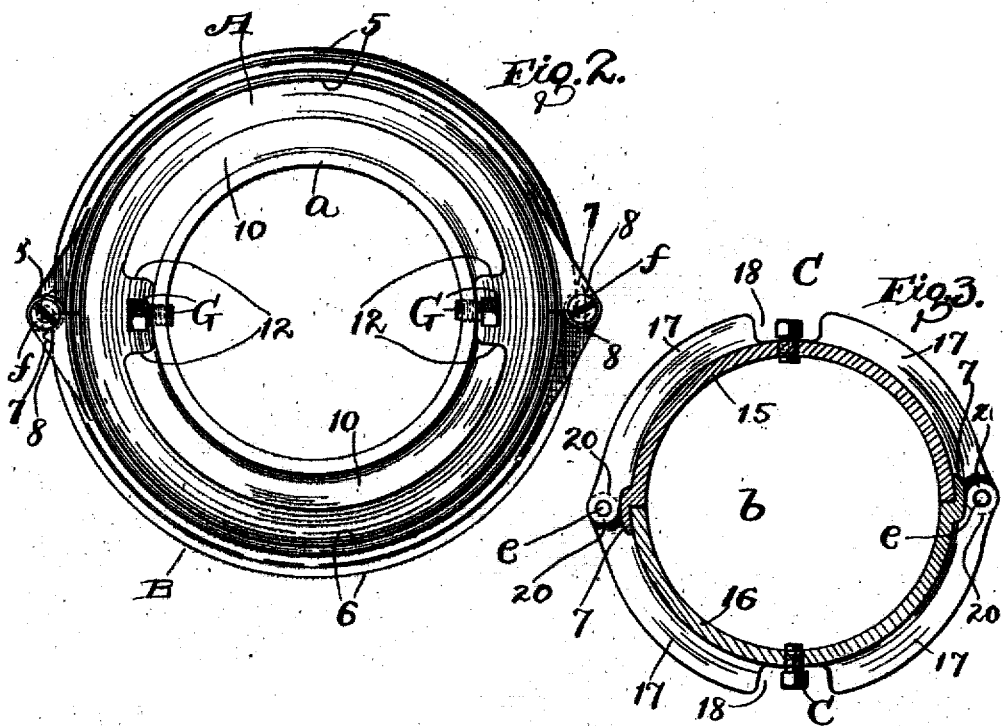
WITNESSES:
Daniel E. Haly.
B. C. Brown.
INVENTOR
Isador Lehman
BY
ATTORNEYS

UNITED STATES PATENT OFFICE.

ISADOR LEHMAN, OF CLEVELAND, OHIO.

CASING FOR UNIVERSAL JOINTS.

No. 826,585.  Specification of Letters Patent.  Patented July 24, 1906.

Application filed April 3, 1906. Serial No. 309,687.

*To all whom it may concern:*

Be it known that I, ISADOR LEHMAN, a citizen of the United States of America, residing at Cleveland, in the county of Cuyahoga and State of Ohio, have invented certain new and useful Improvements in Casings for Universal Joints; and I hereby declare the following to be a full, clear, and exact description of the invention, such as will enable others skilled in the art to which it pertains to make and use the same.

This invention relates to improvements in casings for universal joints, and pertains more especially to a casing for excluding dust and dirt and for preventing the escape of lubricant from a universal joint employed in establishing operative connection between two shafts adjustable at an angle to each other.

The object of this invention is to provide a casing of the character indicated which is simple and durable in construction and whose component parts are readily assembled.

With this object in view and to the end of realizing other advantages hereinafter appearing, this invention consists in certain meritorious features of construction and combinations of parts hereinafter described, and pointed out in the claims.

In the accompanying drawings, Figure 1 is a side elevation of a casing embodying my invention. Fig. 2 is a left-hand end elevation relative to Fig. 1. Fig. 3 is a section on line 3 3, Fig. 1, looking outwardly.

My improved casing for a universal joint comprises two segmentally spherical or globular metal shells A and B, turnable the one, A, within the other, B. The inner shell A is composed, preferably, of a single piece and terminates at its outer end in a cylindrical sleeve $a$, which is integral with the said shell. The outer shell B terminates at its outer end in a cylindrical sleeve $b$, which is rigid with the said shell. The sleeves $a$ and $b$ of the shells A and B accommodate the extension into the said shells of the shafts (not shown) to be coupled together by a universal joint within the said shells.

The shell B is divided longitudinally and centrally into the two corresponding and interchangeable sections 5 and 6 to accommodate the assemblage of the parts and access to the interior of my improved casing.

Each section of the shell B is provided with a flange 7, which is arranged longitudinally of the casing and overlaps the other section of the said shell and extends along one of the joints formed between the two shell-sections 5 and 6. The flange 7 of the shell-section 5 is arranged at one side of the casing, and the flange 7 of the shell-section 6 is arranged at the opposite side of the casing.

The shell-section 5 terminates at its outer end in a half-sleeve 15, which is integral with the said shell-section. The shell-section 6 terminates at its outer end in a half-sleeve 16, which is integral with the said shell-section 6. The two half-sleeves 15 and 16 are oppositely arranged and form the sleeve $b$.

Each half-sleeve is provided a suitable distance from its inner end and externally with two flanges 17 and 17, which extend circumferentially of opposite sides, respectively, of the said half-sleeve (see Fig. 3) and are spaced apart centrally between the longitudinal edges of the said half-sleeve to form a recess 18 between the adjacent ends of the said flanges, which recess is for the purpose of accommodating the provision of the said half-sleeve with a set-screw C between the said ends of the said flanges. The set-screws C are obviously instrumental in securing the shell B to the shaft (not shown) adapted to extend into the said shell through the sleeve $b$.

The two half-sleeves are suitably secured together at the joints formed between them, and preferably the adjacent ends of adjacent flanges 17 of the two half-sleeves 15 and 16 are provided with ears 20, which overlap each other circumferentially of the half-sleeves and are secured together by a screw $e$, which is screwed into the said ears longitudinally of the said half-sleeves, so that the said screw is well able to adequately withstand any strain to which it may be subjected circumferentially of the said half-sleeves.

The flanges 7 of the two shell-sections 5 and 6 are extended to the adjacent ends of the adjacent flanges 17 of the half-sleeves 15 and 16. The flanges 7 extend, therefore, along the joints formed between the shell-sections 5 and 6 and along the joints formed between the half-sleeves 15 and 16 from the points where the said half-sleeves are secured together by the screws $e$ into suitable proximity to the inner ends of the said shell-sections.

Each section of the shell B is provided externally and at its inner end with two ears 8, arranged at opposite sides, respectively, of the said section. Adjacent ears 8 of the two shell-sections 5 and 6 overlap each other circumferentially of the shell B, and a screw f is screwed into the said adjacent overlapping ears longitudinally of the adjacent joint formed between the said shell-sections, so that the said screw is well able to adequately withstand any strain to which it may be subjected circumferentially of the said shell-sections.

It will be observed that the screws e and f are arranged longitudinally of the outer shell B, as already indicated, and are instrumental in preventing the separation of the sections 5 and 6 of the said shell without undue strain upon the screws.

The sleeve a is provided a suitable distance from its inner end and externally with two flanges 10 and 10, arranged at opposite sides, respectively, and extending circumferentially of the sleeve, which flanges are spaced circumferentially of the sleeve to form recesses 12 between adjacent ends of the flanges, so as to accommodate the application of set-screws G to the sleeves from within the said recesses. The set-screws G are obviously instrumental in securing the shell A to the shaft (not shown) adapted to extend into the said shell through the sleeve a.

It will be observed that the flanges 10 and 17 of the sleeves a and b protect the set-screws C and G against injury, and in addition the said flanges materially reinforce the sleeves.

It will be observed also that the flanges 7 form dust-guards for excluding dust and dirt from entering the casing at the joints formed between the shell-sections 5 and 6, and I would here remark that the joint formed between and circumferentially of the shells A and B may be packed in any approved manner.

What I claim is—

1. A casing for a universal joint, said casing comprising two segmentally spherical or globular shells turnable the one within the other, with the inner shell terminating at its outer end in a sleeve which is integral with the said shell, with the sleeve provided a suitable distance from its inner end and externally with two flanges arranged at opposite sides respectively and extending circumferentially of the sleeve, with the said flanges spaced circumferentially of the sleeve to form recesses between adjacent ends of the flanges, and with the outer shell divided longitudinally and centrally into sections suitably secured together and terminating at its outer end in a sleeve formed partially on each section of the outer shell.

2. A casing for a universal joint, said casing comprising two segmentally spherical or globular shells turnable the one within the other, with the inner shell terminating at its outer end in a sleeve which is provided externally with two flanges arranged at opposite sides respectively and extending circumferentially of the sleeve, with the said flanges spaced circumferentially of the sleeve to form recesses between adjacent ends of the flanges, and with the outer shell divided longitudinally and centrally into sections suitably secured together and terminating at its outer end in a sleeve formed partially on each section of the outer shell.

3. A casing for a universal joint, said casing comprising two segmentally spherical or globular shells turnable the one within the other, with the inner shell terminating at its outer end in a sleeve which is rigid with the said shell, with the sleeve provided externally with flanges extending and spaced circumferentially of the sleeve, and with the outer shell divided longitudinally and centrally into sections suitably secured together and terminating at its outer end in a sleeve formed partially on each section of the outer shell.

4. A casing for a universal joint, said casing comprising two segmentally spherical or globular shells turnable the one within the other, with the inner shell terminating at its outer end in a sleeve, with the outer shell divided longitudinally and centrally into sections suitably secured together, with each section of the outer shell terminating at its outer end in a half-sleeve integral with the said outer shell and arranged opposite the half-sleeve of the other section of the outer shell, and with each half-sleeve provided exteriorly and a suitable distance from its inner end with two flanges which extend circumferentially of the said half-sleeve and are spaced to form a recess between the adjacent ends of the said flanges.

5. A casing for a universal joint, said casing comprising two segmentally spherical or globular shells turnable the one within the other, with the inner shell terminating at its outer end in a sleeve, with the outer shell divided longitudinally and centrally into sections suitably secured together, with each section of the outer shell terminating at its outer end in a half-sleeve rigid with the said outer shell and arranged opposite the half-sleeve of the other section of the outer shell, and with the half-sleeves provided exteriorly with circumferentially-extending flanges which are spaced to form a recess between the adjacent ends of the adjacent flanges.

6. A casing for a universal joint, said casing comprising two segmentally spherical or globular shells turnable the one within the other, with the inner shell terminating at its outer end in a sleeve, with the outer shell divided longitudinally and centrally into sections suitably secured together at the inner end of the shell, with each section of the outer shell terminating at its outer end in a half-sleeve rigid with the said outer shell and arranged opposite the half-sleeve of the other section of the outer shell, with the half-sleeves provided exteriorly with flanges extending circumferentially of the said half-sleeve and secured together at the joints formed between them.

7. A casing for a universal joint, said casing comprising two segmental spherical or globular shells turnable the one within the other, with the inner shell terminating at its outer end in a sleeve, with the other shell divided longitudinally and centrally into two sections, with each section of the outer shell provided at its inner end with ears which overlap the ears on the other section of the said shell circumferentially of the shell, and with each section of the outer shell terminating at its outer end in a half-sleeve which is arranged opposite the half-sleeve of the other section of the said shell, with each half-sleeve provided with ears which circumferentially overlap the ears of the other half-sleeve; screws screwed into the overlapping ears of the half-sleeves longitudinally of the joints formed between the half-sleeves, and screws screwed into the first-mentioned overlapping ears of the sections of the aforesaid outer shell longitudinally of the joints formed between the said sections.

8. A casing for a universal joint, said casing comprising two segmentally spherical or globular shells turnable the one within the other, with the inner shell terminating at its outer end in a sleeve, with the other shell divided longitudinally and centrally into two sections, with each section of the outer shell provided at its inner end with ears which overlap the ears on the other section of the said shell circumferentially of the shell, and with each section of the outer shell terminating at its outer end in a half-sleeve which is arranged opposite the half-sleeve of the other section of the said shell, with each half-sleeve provided with ears which circumferentially overlap the ears of the other half-sleeve; fastening devices arranged within the overlapping ears of the half-sleeves longitudinally of the joints formed between the half-sleeves, and fastening devices arranged within the first-mentioned overlapping ears of the sections of the aforesaid outer shell longitudinally of the joints formed between the said sections.

9. A casing for a universal joint, said casing comprising two segmentally spherical or globular shells turnable the one within the other, with the inner shell terminating at its outer end in a sleeve, with the outer shell divided longitudinally and centrally into two sections, with each section of the outer shell provided at its inner end with ears which overlap and are suitably secured to the ears of the other section of the said shell, with the said ears arranged adjacent the joints formed between the two sections of the outer shell, with each section of the outer shell terminating at its outer end in a half-sleeve which is arranged opposite the half-sleeve of the other section of the said shell, with each half-sleeve rovided with ears which overlap and are suitably secured to the ears of the other half-sleeve, and with the ears of the half-sleeves arranged at the joints formed between the half-sleeves.

10. A casing for a universal joint, said casing comprising two segmentally spherical or globular shells turnable the one within the other, with the inner shell terminating at its outer end in a sleeve, with the outer shell divided longitudinally and centrally into two sections, with each section of the outer shell provided at its inner end with ears which overlap and are suitably secured to the ears of the other section of the said shell, with the said ears arranged adjacent the joints formed between the two sections of the outer shell, with each section of the outer shell terminating at its outer end in a half-sleeve which is arranged opposite the half-sleeve of the other section of the said shell, with each half-sleeve provided with ears which overlap and are suitably secured to the ears of the other half-sleeve, and with the ears of the half-sleeves arranged at the joints formed between the half-sleeves, and there being two dust-guard-forming flanges formed on the different sections respectively of the outer shell at the joints formed between the said sections, with the said flanges arranged longitudinally of the said joints and extending from the ears of the aforesaid half-sleeves to the first-mentioned ears.

In testimony whereof I sign the foregoing specification in the presence of two witnesses.

ISADOR LEHMAN.

Witnesses:
C. H. DORER,
B. C. BROWN.